United States Patent Office 3,269,124
Patented August 30, 1966

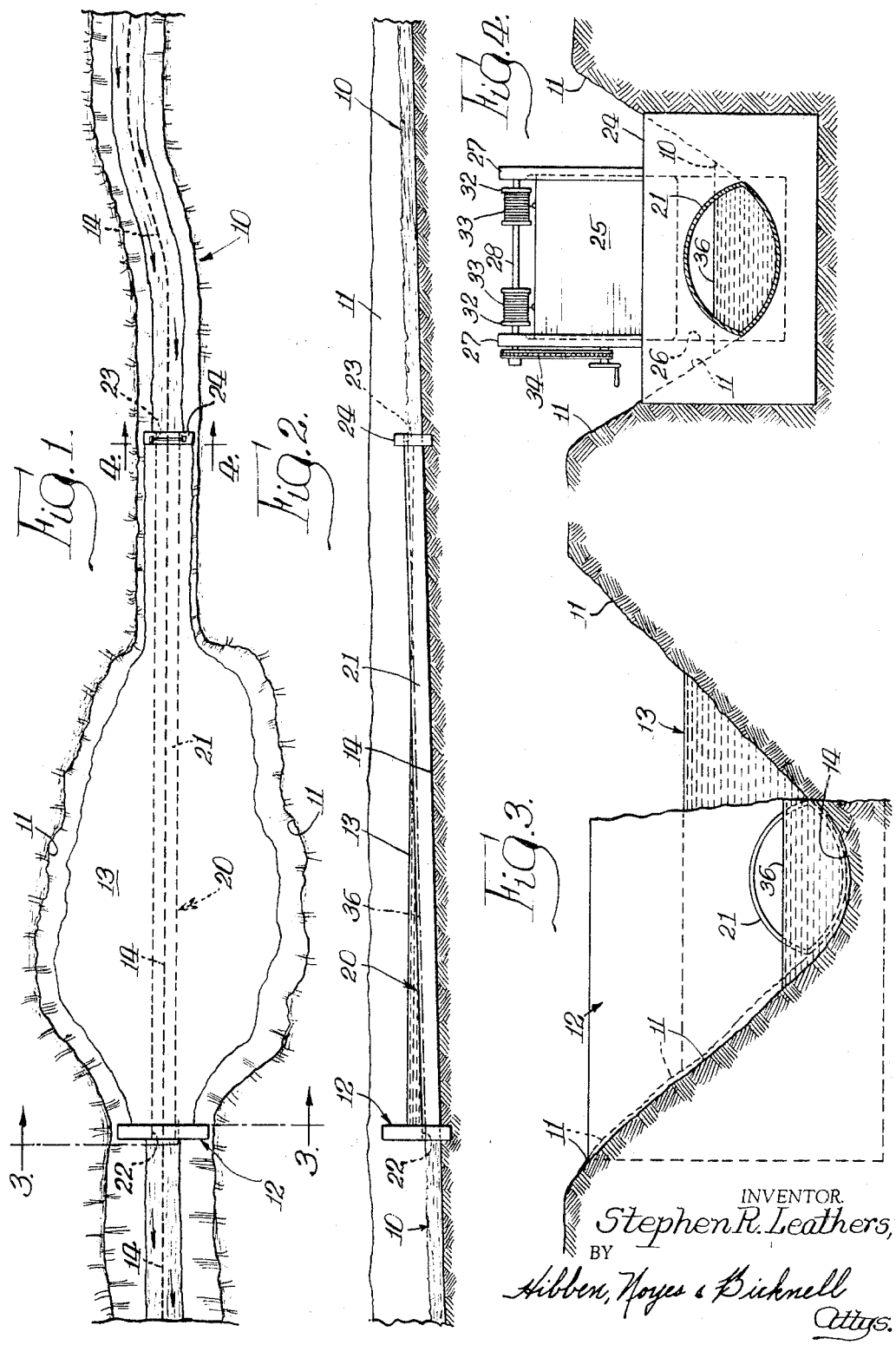

3,269,124
TUNNEL FISHWAY
Stephen R. Leathers, 1335 W. Birchwood, Chicago, Ill.
Filed Nov. 29, 1963, Ser. No. 326,807
2 Claims. (Cl. 61—21)

This invention relates to fishways, and more particularly to an improved fishway which facilitates upstream and downstream passage of fish through a dam.

The presence of dams across our streams and rivers continues to present a serious obstacle to upstream and downstream movements of fish past the dam. Various devices have been employed to solve this problem, as for example the so-called "fish ladder" and the trap-transport arrangements. While such structures have achieved moderate success insofar as assisting the fish to pass the dam when they are in close proximity thereto, they have not solved the somewhat unexpected problem of apparent loss of directional sense in the fish when they encounter the large quiescent backwater zone of the dam. Such disorientation or loss of directional sense is particularly apparent in the case of salmon where large numbers of adult fish migrating upstream to spawn and hatched fingerlings drifting downstream are lost in the quiescent backwater. Such backwater not only eliminates the stream current, which is believed to guide the upstream migration of the fish, but also appears to eliminate or alter in some way the particular vegetation odor of the stream, which is also believed to be a guide for the fish.

Accordingly, it is the general object of the present invention to provide a novel and improved fishway which facilitates upstream and downstream passage of fish through a dam or other obstruction spanning a stream.

Another object is to provide a novel fishway of the foregoing character which substantially duplicates the original flow path and conditions of the stream throughout the length of the fishway.

A further object is to provide a novel tunnel-type fishway which, when operable, maintains the natural stream flow rate therethrough.

Still another object is to provide a novel fishway of the foregoing character which extends upstream through the entire backwater of an associated dam.

A further object is to provide a novel tunnel-type fishway which is effective, when operable, to divert the entire flow of the stream therethrough.

These and other objects will be apparent from the following detailed description and accompanying sheet of drawings in which:

FIG. 1 is a semi-diagrammatic top plan view of a stream or like body of water having a dam extending thereacross and showing the relationship of a fishway embodying the features of the present invention with respect to the dam and its backwater;

FIG. 2 is a side view of the dam and fishway shown in FIG. 1, taken longitudinally of the stream;

FIG. 3 is an enlarged, fragmentary sectional view taken substantially along the line 3—3 of FIG. 1; and FIG. 4 is an enlarged sectional view taken along the line 4—4 of FIG. 1.

In FIGS. 1 and 2, a river or stream 10 having banks 11 is illustrated, the direction of flow of the stream 10 being from right to left and indicated by arrows in FIG. 1. A dam 12 is shown spanning the stream 10 and defining a stationary or quiescent backwater 13 extending upstream of the dam. The extent to which the backwater 13 extends upstream of course depends upon the water level maintained by the dam. The bed of the stream 10, including that portion thereof which extends through the backwater 12, is indicated by the dotted line in FIG. 1 and identified by the reference numeral 14.

In order to permit fish to pass upstream and downstream of the dam 11, particularly during their natural migration periods, a fishway 20 embodying the features of the present invention is provided. The fishway 20, in the present instance, is of the tunnel type and comprises an elongated conduit 21 which may be constructed of any suitable material such as concrete, steel pipe, or the like, so long as the connected lengths thereof are watertight throughout the length of the conduit and sufficiently strong to resist the pressure head of the backwater 13 at the juncture of the conduit with the dam 12. While the conduit 21 may have any cross sectional shape, it is preferably generally elliptical in cross section (FIGS. 3 and 4), with the longer dimension of the ellipse extending horizontally. For reasons which will appear more fully hereinafter, the cross-sectional area of the conduit 21 throughout its length must be such as to accommodate the entire flow of the stream 10 therethrough and to maintain the flow rate substantially constant.

To this end, the downstream end, indicated at 22, of the conduit 21 is mounted in and extends through the dam 12 so that the end 22 opens on the downstream side of the dam and at substantially the same level as the stream 10. Because the conduit 21 is subject to the entire pressure head of the backwater 13 thereabove, the structure of the conduit 21 must be quite strong at this point. A suitable seal arrangement must be provided to prevent leakage between the periphery of the conduit and the opening in the dam 12 through which the conduit extends.

According to the present invention, the conduit 21 extends upstream through the backwater 13 and preferably some distance beyond. In addition, the path of the conduit 21 is the same as the bed 14 of the stream 10, including that portion of the bed extending through the backwater 13. While that portion of the bed 14 of the stream which passes through the backwater 13 is illustrated as being straight, it will be understood that if the former stream bed 14 was of another configuration, the conduit 21 would follow the same contour.

In addition to following the horizontal path of the bed 14 of the stream 10, it is desirable that the conduit 21 also follow the former level or grade of the bed 14, as illustrated in FIG. 2. Thus, the conduit 21 is a substantial duplication of the former stream path through the backwater 13. The other or upstream end, indicated at 23, of the conduit 21 is disposed at least at the upstream terminus of the backwater 13 and preferably somewhat further upstream so that the upstream end 23 is located in a natural flow region of the stream.

According to the present invention, the upstream end 23 of the conduit 21 is mounted in means defining an embankment or a small dam 24. The embankment 24 spans the stream 10 and is effective to divert the entire stream flow into the conduit 21 when the upstream end 23 thereof is open. When the end 23 is closed, the level of the stream 10 will rise sufficiently to flow over the embankment.

For opening and closing the upstream end 23 of the conduit, the embankment 24 is provided with a gate 26. While any particular gate arrangement may be provided, the gate 25, in this instance, comprises a vertically disposed plate of somewhat greater size than that of the conduit 21 and adapted to be raised or lowered in a slot 26 formed in the embankment 24 to control the size of the opening of the upper end 23 of the conduit. The gate 25, in the present instance, is supported by a pair of upstanding posts 27 carried by the embankment and having a rotatably mounted shaft 28 extending therebetween. A pair of spaced spools or drums 32 are mounted on the shaft 28 and one or more lengths of cable or chain 33 are connected at each end to the spools 32 and plate 25. Thus, rotation of the shaft 28 in either direction will cause the gate 25 to be raised or lowered. Such rotation may be accomplished in any desired manner, as for example by a chain and sprocket arrangement, indicated generally at 34 in FIG. 4.

The operation of the tunnel fishway 20 is as follows. When adult fish are migrating upstream to spawn, the gate 25 is raised, as shown in FIG. 4, to permit the entire stream 10 to flow into the open upstream end 23 and through the conduit 21. Such diversion is due to the provision of the embankment 24. Because the conduit 21 is disposed at the same level as the bed 14 of the stream 10 and follows the original path of the bed 14 throughout its length, including that portion of the bed which extends through the backwater 12, the flow through the conduit 21 is substantially the same as the original stream flow before the dam 11 was erected. To further stimulate such natural flow conditions, baffles or other flow altering objects may be placed along the length of the conduit 21 and the interior thereof illuminated. The level of the stream 10 through the conduit 21 is indicated at 36 by the dot-dash line in FIG. 2 and in full lines in FIGS. 3 and 4, it being seen that the conduit 21 is sized to be only partly filled when the entire stream is diverted therethrough to provide for natural open-channel flow. Because the conduit 21 is isolated from the backwater 12, no increase in pressure occurs throughout the length of the conduit so that the stream emerges at the downstream side of the dam 11 in a natural manner and as at the same level as the stream 10. Thus, adult fish migrating upstream to spawn encounter substantially the same conditions while migrating through the tunnel 21 as they would in a natural stream. Conversely, the hatched fingerlings drifting downstream will encounter substantially natural stream conditions as they enter and pass through the conduit 21. The natural migration instincts of the fish are thus preserved.

During the wintertime and other periods of the year when fish are not spawning or otherwise migrating to any extent, the gate 25 may be lowered and the upstream end 23 of the conduit 21 closed to prevent the stream 10 from being diverted through the conduit 21. The stream 10 will thus rise sufficiently to overflow the embankment 24, which is of relatively small height, and flow downstream in a natural manner toward the dam 11.

It will thus be appreciated that the tunnel fishway herein disclosed provides several important advantages over the structures heretofore proposed for in use. First, the present fishway provides a substantially natural passage for the fish by duplicating, as nearly as possible, the original flow path and rate of the stream before the dam was erected. The natural migratory instincts of the fish are thus preserved. Second, the structure is inexpensive in comparison to some proposed arrangements. Third, installation of the fishway is relatively simple and lends itself to incorporation in existing dams without major reconstruction of the structures.

While only one embodiment of the invention has been illustrated and described, it will be understood that variations and modifications thereof may be effected without departing from the scope of the invention as set forth in the appended claims.

I claim:
1. A fishway adapted to facilitate upstream and downstream passage of fish in a stream having a dam or the like extending thereacross, said dam defining a substantially quiescent backwater zone upstream thereof which includes the former bed of said stream, said fishway comprising conduit means extending through said dam and having one end thereof opening on the downstream side of said dam, said one end being disposed at substantially the same level as the level of the stream on the downstream side of the dam, said conduit means extending upstream from said dam through said quiescent backwater and having its other end opening at substantially the same level as said stream, said conduit means having a cross sectional area sufficiently large to accommodate the entire stream flow therethrough under normal open-channel conditions of flow, whereby flow through said conduit means substantially simulates the original stream flow, means at said other end of said conduit means for diverting said stream into the former, said diverting means comprising an embankment spanning said stream, said other end of said conduit means extending thruogh said embankment and opening on the upstream side thereof, and said embankment isolating said other end of said conduit means from said quiescent backwater zone, and a gate carried by said diverting means for opening and closing said other end of said conduit means to control stream flow therethrough, said diverting means being operable when said gate is open to direct the entire stream flow through said conduit means, whereby fish may migrate upstream or downstream of said dam along a substantially natural path through said conduit means.

2. A fishway according to claim 1 in which said conduit means is generally elliptical in cross section with the longer axis of the ellipse extending horizontally.

References Cited by the Examiner
UNITED STATES PATENTS

| | | | |
|---|---|---|---|
| 286,869 | 10/1883 | Trammer | 61—21 |
| 474,863 | 5/1892 | Sanderson | 61—21 |
| 1,569,419 | 1/1926 | Chase | 61—21 |
| 1,638,428 | 8/1927 | Zander. | |
| 2,174,657 | 10/1939 | Helsel | 61—21 |
| 3,037,356 | 6/1962 | Alcoriza | 61—12 |

EARL J. WITMER, *Primary Examiner.*